(12) United States Patent
Han et al.

(10) Patent No.: US 9,115,568 B2
(45) Date of Patent: Aug. 25, 2015

(54) REDUCTION OF TOOL MODE AND DRILLING NOISE IN ACOUSTIC LWD

(75) Inventors: Wei Han, Sugar Land, TX (US); Jun Zhang, Katy, TX (US); Paul Boonen, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1455 days.

(21) Appl. No.: 12/568,847

(22) Filed: Sep. 29, 2009

(65) Prior Publication Data
US 2011/0073368 A1    Mar. 31, 2011

(51) Int. Cl.
*G01V 1/46* (2006.01)
*E21B 47/01* (2012.01)

(52) U.S. Cl.
CPC .. *E21B 47/01* (2013.01); *G01V 1/46* (2013.01)

(58) Field of Classification Search
CPC .................................. E21B 47/01; G01V 1/46
USPC .......... 367/25, 43, 46, 35; 181/104, 112, 105; 702/6, 14, 17
See application file for complete search history.

(56) References Cited

U.S. PATENT DOCUMENTS

| | | | |
|---|---|---|---|
| 4,698,792 A | 10/1987 | Kurkjian et al. | |
| 4,774,693 A | 9/1988 | Winbow et al. | |
| 4,779,236 A | 10/1988 | Sondergeld | |
| 5,278,805 A | 1/1994 | Kimball | |
| 5,639,997 A | 6/1997 | Mallett | |
| 5,780,784 A * | 7/1998 | Robbins | 181/102 |
| 5,852,262 A | 12/1998 | Gill et al. | |
| 5,886,303 A | 3/1999 | Rodney | |
| 5,936,913 A | 8/1999 | Gill et al. | |
| 6,470,275 B1 * | 10/2002 | Dubinsky | 702/9 |
| 6,614,360 B1 | 9/2003 | Leggett, III et al. | |
| 6,631,327 B2 | 10/2003 | Hsu et al. | |
| 6,661,737 B2 | 12/2003 | Wisnieswski et al. | |
| 6,671,224 B1 | 12/2003 | Pabon | |
| 6,678,616 B1 | 1/2004 | Winkler et al. | |
| 6,714,480 B2 | 3/2004 | Sinha et al. | |
| 6,766,252 B2 | 7/2004 | Blanch et al. | |
| 6,791,899 B2 | 9/2004 | Blanch et al. | |
| 6,995,500 B2 * | 2/2006 | Yogeswaren | 310/334 |
| 7,036,363 B2 * | 5/2006 | Yogeswaren | 73/152.16 |
| 7,039,524 B2 | 5/2006 | Haugland | |
| 7,075,215 B2 * | 7/2006 | Yogeswaren | 310/334 |
| 8,218,393 B2 * | 7/2012 | Beasley | 367/23 |

* cited by examiner

*Primary Examiner* — Krystine Breier
(74) *Attorney, Agent, or Firm* — Kimberly Ballew; Mark D. Shelley, II (57) ABSTRACT

A downhole measurement tool includes at least one regular receiver and at least one reference receiver externally deployed on a tool body. The reference receiver is configured to be acoustically isolated from the borehole, for example, via an isolation structure including a high-impedance cap and a low-impedance gap. The reference receiver may be deployed in a linear array with the regular receiver(s) and may be substantially identical to the regular receiver(s) such that it has substantially the same sensitivity to tool mode signals and internal drilling noise as do the regular receivers. Received waveforms may be processed so as to remove tool mode arrivals and/or drilling noise.

17 Claims, 6 Drawing Sheets

REDUCTION OF TOOL MODE AND DRILLING NOISE IN ACOUSTIC LWD

RELATED APPLICATIONS

None.

FIELD OF THE INVENTION

The present invention relates generally to acoustic logging while drilling operations. Certain exemplary embodiments of the invention relate to an acoustic logging while drilling tool configured to reduce (or even cancel) tool mode extensional and flexural waves and drilling noise.

BACKGROUND OF THE INVENTION

The use of acoustic (e.g., audible and/or ultrasonic) measurement systems in prior art downhole applications, such as logging while drilling (LWD) and wireline logging applications is well known. In one common logging operation, acoustic waveforms may be generated at one or more transmitters deployed in the borehole. The acoustic responses may then be received at an array of longitudinally spaced receivers deployed in the borehole. Acoustic logging in this manner provides an important set of borehole data and is commonly used in both LWD and wireline applications to determine compressional and shear wave velocities (also referred to in the art as slowness) of a formation. Those of ordinary skill in the art will appreciate that the terms slowness and velocity are often used interchangeably with the understanding that they are inversely related to one another and that the measurement of either may be converted to the other by simple mathematical calculations. The term velocity is used predominately herein.

As is known to those of ordinary skill in the art, acoustic LWD introduces significant difficulties as compared to acoustic wireline logging. In particular, both tool mode arrivals (signals) and drilling noise are known to affect both detection capability and efficiency and the data quality of the received waveforms. Tool mode arrivals include sonic energy that travels along the metallic tool body from the transmitter(s) to the receivers. These arrivals generally include both a fast travelling extensional wave and a slower (lower velocity) flexural wave, both of which travel along the tool body and therefore bypass the formation. Tool mode noise can therefore interfere with the determination of both compressional and shear wave velocities. Drilling noise includes vibrational energy caused by the drilling process (e.g., including the grinding action of the bit on the formation, impacts between the drill string and the borehole wall, and the circulation of drilling fluid in the tool and annulus). Drilling noise commonly has a frequency of less than or equal to about 5 kHz and therefore predominately (although not exclusively) interferes with the determination of a formation shear wave velocity.

Tool mode arrivals are readily accommodated in wireline logging operations. For example, a slotted steel housing and flexible rubber/steel segmented isolation assemblies are commonly employed to attenuate the tool mode signals. While these assemblies tend to work well in wireline operations, they are generally impractical in LWD operations since they can significantly reduce the mechanical strength of the tool body. Drilling noise is, of course, not present in wireline operations.

Numerous techniques have been employed to accommodate tool mode arrivals and drilling noise in LWD operations. For example, various mechanical isolation mechanisms are known in the art. While these mechanisms can provide some attenuation of the tool mode signals, they are limited due to mechanical strength constraints and therefore do not fully attenuate the tool modes. Signal processing algorithms have also been employed to remove the tool modes. However, in many operations significant tool mode noise remains after processing, due in part to the complicated and unpredictable downhole conditions including temperature, pressure, and drilling fluid affects as well as drilling factors including shock, vibration, and tool eccentricity in the borehole. Moreover, these mechanical and signal processing mechanisms do not tend to fully address the above described low frequency drilling noise.

One other approach has been to deploy reference receivers of various kinds internally in the logging while drilling tool body. These reference receivers are intended to sense tool mode signals and drilling noise so that they can be cancelled or otherwise accommodated. For example, U.S. Pat. No. 5,780,784 to Robbins teaches a reference receiver and adaptive filter for receiving the tool mode signal and generating a tool mode corrected signal. The reference receiver is disclosed as being deployed internally in the tool. U.S. Pat. No. 5,886,303 to Rodney discloses a configuration in which multiple reference receivers (and/or motion sensors) are deployed internally in the tool so as to cancel out unwanted noise signals. U.S. Pat. No. 6,470,275 to Dubinsky discloses the use of internally deployed reference accelerometers (rather than acoustic receivers) to cancel out tool mode signals.

While these approaches may enable the removal (or reduction) of some tool mode arrivals and/or drilling noise, there is yet room for further improvement. In particular, there is a need for an apparatus and method for substantially eliminating tool mode and drilling noise signals.

SUMMARY OF THE INVENTION

The present invention addresses one or more of the above-described drawbacks for making formation acoustic velocity measurements. In one exemplary embodiment, the invention includes a logging while drilling tool including at least one transmitter axially spaced from at least one regular acoustic receiver. The tool further includes at least one externally deployed reference receiver which is configured to be acoustically isolated from the borehole (e.g., via a stiff, high-impedance cap and a low-impedance gap). In preferred embodiments, the reference receiver is deployed in a linear array with a plurality of regular receivers. The reference receiver is preferably substantially identical to the regular receivers with the exception of the high-impedance cap and the low-impedance gap and therefore tends to have substantially the same sensitivity to tool mode signals and internal drilling noise as do the regular receivers in the array.

In one exemplary method embodiment in accordance with the invention, acoustic waveforms are received during transmitter firing and in a quiet mode in which there is no transmitter firing. These waveforms may then be processed so as to remove tool mode arrivals and/or drilling noise. Tool mode arrivals may also be isolated by making acoustic measurements when drilling has stopped (e.g., when adding a length of drill pipe to the string).

Exemplary embodiments of the present invention provide several technical advantages. For example, exemplary reference receivers in accordance with the present invention advantageously have a similar sensitivity to both the tool mode signals and internal drilling noise as do the regular acoustic receivers. This leads to more accurate tool mode and drilling noise prediction at each of the regular receivers and therefore further enables the individual contributions of the formation signal, tool mode signal, and drilling noise to be accurately determined. Removal and/or reduction of the tool mode signal and/or drilling noise further improves the quality of the formation signal, which in turn improves the accuracy of compressional and shear wave velocity measurements.

Those of ordinary skill in the art will appreciate that drilling noise is predominately less than about 5 kHz. Since the present invention provides for better detection and reduction of such drilling noise it may further enable the use of lower frequency acoustic energy (e.g., less than 5 kHz). Such a reduction in frequency is expected to provide for a more accurate determination of the shear wave velocity (in both fast and slow formations). Moreover, the use of a lower frequency acoustic signal tends to improve the flexural wave response, enlarge the detection window for slow shear and stoneley waves, and increase the depth of investigation into the formation.

The use of one or more reference receivers in accordance with the present invention also advantageously obviates the need for the use of a tool mode isolation assembly. Elimination of such assemblies tends to both improve the mechanical strength of the tool and reduce fabrication cost.

In one aspect the present invention includes a downhole acoustic measurement tool. The tool includes at least one acoustic transmitter deployed on a downhole tool body. The transmitter is configured to transmit an acoustic wave into a subterranean borehole. At least one regular acoustic receiver is deployed on an external surface of the tool body. The regular receiver is longitudinally spaced from the transmitter and configured to receive a transmitted acoustic waveform. At least one reference acoustic receiver is deployed on the external surface of the tool body and is configured such that it is acoustically isolated from the borehole.

In another aspect, the present invention includes a downhole acoustic measurement tool. The tool includes at least one acoustic transmitter deployed on the tool body, the transmitter being configured to transmit an acoustic wave into a subterranean borehole. A linear array of acoustic receivers is deployed on the tool body. The array of receivers is longitudinally spaced from the transmitter and includes a plurality of longitudinally spaced apart regular receivers and at least one reference receiver. The reference receiver is configured such that it is acoustically isolated from the borehole. At least one of the regular receivers and the reference receiver include a multi-layer structure deployed in a receiver housing. The multi-layer structure includes an acoustic transducer interposed between an impedance matching layer and an attenuating backing layer. The regular receiver housing and the reference receiver housing are the same size and shape and are fabricated from the same material and the regular receiver multi-layer structure and the reference receiver multi-layer structure are the same size and shape and are fabricated from the same materials.

In still another aspect, the present invention includes a method for reducing tool mode signals and drilling noise signals from an acoustic waveform received in subterranean borehole. The method includes deploying a downhole acoustic measurement tool in a borehole. The tool includes at least one acoustic transmitter deployed and at least one regular acoustic receiver deployed on a tool body, the regular receiver being longitudinally spaced from the transmitter. The tool further includes at least one reference acoustic receiver deployed on an external surface of the tool body, the reference receiver being configured such that it is acoustically isolated from the borehole. The method further includes causing the transmitter to transmit acoustic energy into the borehole and causing the regular receiver and the reference receiver to receive corresponding first and second waveforms, the first and second waveforms corresponding to the transmitted acoustic energy. The method still further includes causing the regular receiver and the reference receiver to receive corresponding third and fourth waveforms, the third and fourth waveforms corresponding to a quiet tool mode in which no acoustic energy is transmitted into the borehole. The first, second, third, and fourth waveforms are them processed to obtain a corrected waveform having reduced tool mode signals and drilling noise.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
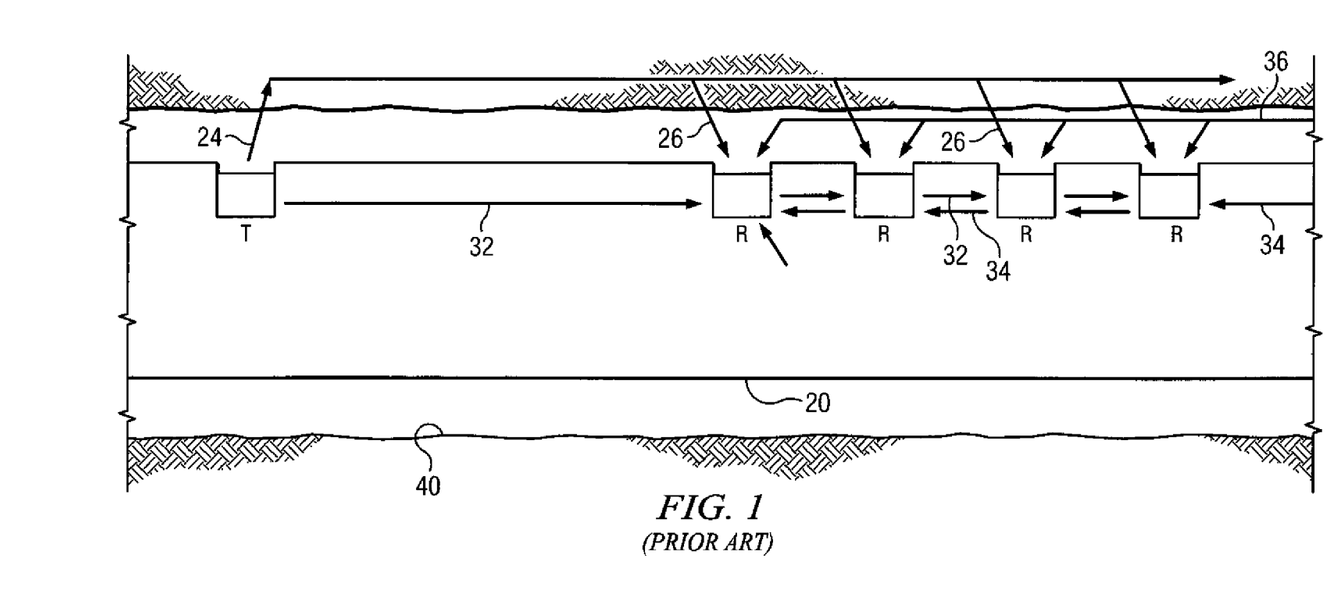
FIG. 1 depicts a prior art acoustic logging while drilling configuration.

FIG. 1 depicts a cross sectional view of a portion of a prior art acoustic logging while drilling tool 20 deployed in a borehole 40. Logging tool 20 is similar to that disclosed in commonly assigned U.S. Pat. No. 7,039,524 to Haugland and includes a transmitter T longitudinally offset from a receiver array having a plurality of longitudinally spaced apart acoustic receivers R. During LWD acoustic logging operations, the transmitter T transmits acoustic energy into the borehole as depicted at 24. A portion of the transmitted energy enters the formation and induces compressional and/or shear waves therein. These waves propagate through the formation and are received at the receivers R as depicted at 26. As is known to those of ordinary skill in the art, the received compressional and shear waves may be utilized to determine compressional and shear wave velocities of the formation (e.g., including conventional time-of-flight calculations).

As is also known to those of ordinary skill in the art, efficient reception of the undistorted compressional and/or shear waves can be difficult due to the presence of one or more of numerous noise signals in a received waveform. These noise signals are depicted schematically in FIG. 1 and are commonly grouped into one of two categories: (i) tool mode arrivals 32 and (ii) drilling noise 34 and 36. It will be appreciated that acoustic energy may also be transmitted from the transmitter to the receivers through the borehole annulus. Such "borehole guided waves" while not depicted on FIG. 1 are well known in the art and may be readily accommodated or even used in determining an acoustic velocity of the formation using known techniques. Hence, there is no further discussion of borehole guided waves.

Tool mode noise typically includes a fast-traveling extensional wave and a slower-traveling flexural wave, each of which propagates from the transmitter T to the receivers R in the tool body as depicted at 32. Those of ordinary skill in the art will appreciate that the tool mode waves are commonly more complex than depicted on FIG. 1 (e.g., tool mode waves are known to sometimes interact with the borehole). Drilling noise may be thought of as including both internal and external drilling noise components (depending on the propagation route). Internal drilling noise propagates in the tool body as depicted at 34 and may be the result of, for example, internal fluid circulation, motor noises, drill bit vibration, and impacts between the drill string and the formation. External drilling noise propagates through the borehole annulus and/or the formation as depicted at 36 and may be the result of annular fluid flow, bit grinding noise in the formation, bit noise in the fluid, and the like. As described above in the Background section, there is a need for an acoustic LWD tool and methods that significantly reduce or even eliminate tool mode signals and drilling noise.

Referring now to FIGS. 2 through 6, exemplary embodiments of the present invention are depicted. With respect to FIGS. 2 through 6, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 2 through 6 may be described herein with respect to that reference numeral shown on other views.

Figure 2:
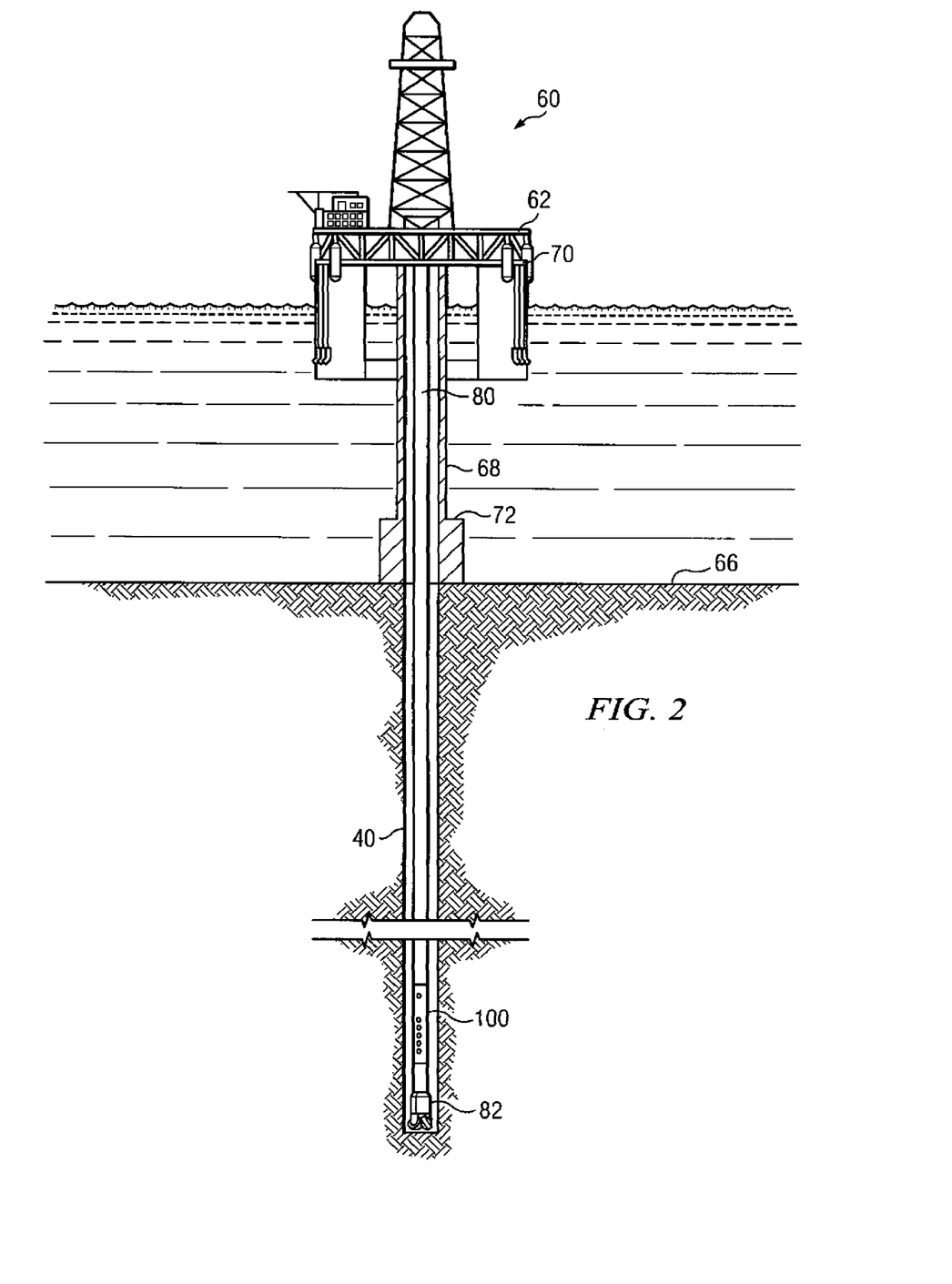
FIG. 2 depicts a schematic representation of an offshore oil and/or gas drilling platform utilizing an exemplary embodiment of the present invention.

FIG. 2 depicts one exemplary embodiment of a measurement tool 100 in accordance with the present invention in use in an offshore oil or gas drilling assembly, generally denoted 60. A semisubmersible drilling platform 62 is positioned over an oil or gas formation (not shown) disposed below the sea floor 66. A subsea conduit 68 extends from deck 70 of platform 62 to a wellhead installation 72. The platform may include a derrick and a hoisting apparatus for raising and lowering the drill string 80, which, as shown, extends into borehole 40 and includes a drill bit 82 and an acoustic logging while drilling tool 100 including at least one reference receiver deployed in an array of spaced apart receivers (shown in more detail on FIGS. 3A through 4B). Drill string 80 may further include substantially any other downhole tools, including for example, a downhole drill motor, a mud pulse telemetry system, and one or more other MWD and/or LWD tools for sensing downhole characteristics of the borehole and the surrounding formation.

It will be understood by those of ordinary skill in the art that the measurement tool 100 of the present invention is not limited to use with a semisubmersible platform 62 as illustrated in FIG. 2. Measurement tool 100 is equally well suited for use with any kind of subterranean drilling operation, either offshore or onshore. While the exemplary embodiments depicted include a logging while drilling tool, it will also be understood that the invention is not limited to such embodiments. The invention may also include tool embodiments configured for the removal of tool mode signals in wireline applications.

Figure 3A:
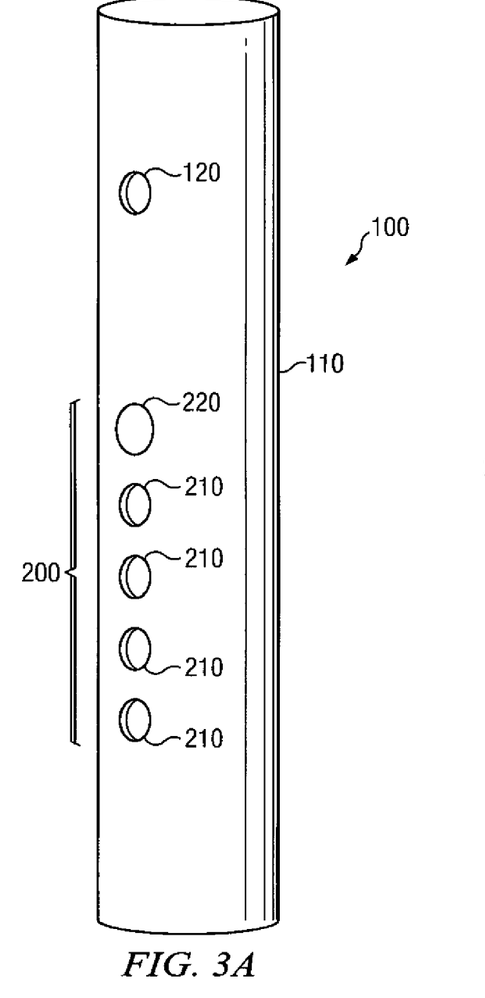
FIG. 3A depicts one exemplary embodiment of the acoustic logging tool shown on FIG. 2.
Figure 3B:
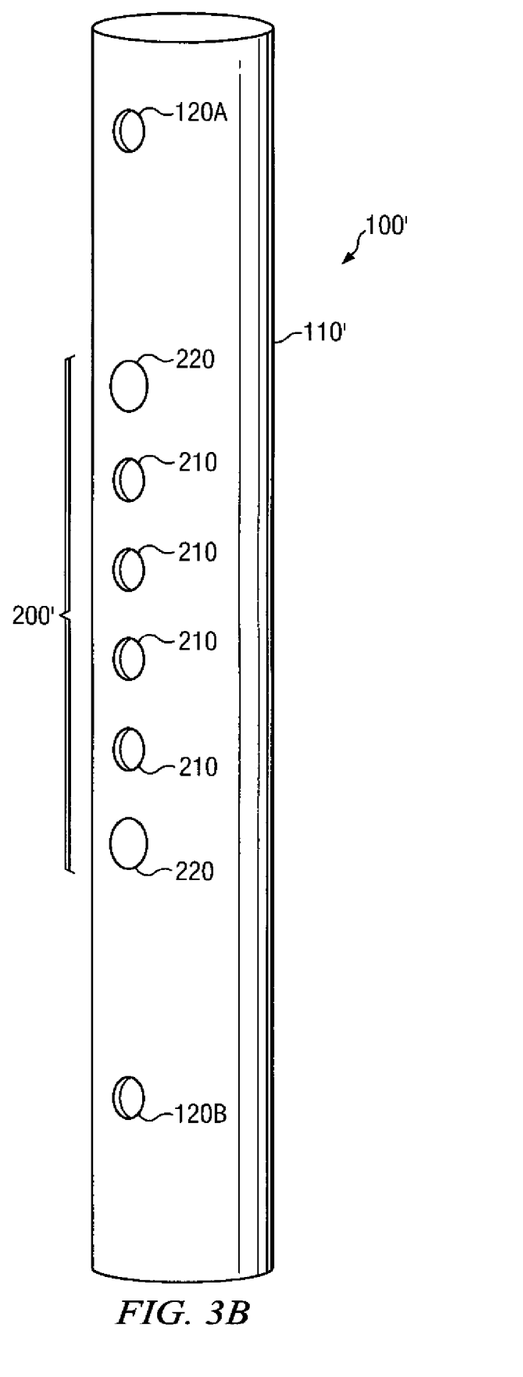
FIG. 3B depicts an alternative embodiment of an acoustic logging tool in accordance with the present invention.

Referring now to FIGS. 3A and 3B, isometric views of exemplary embodiments of measurement tool 100 and 100' are depicted. FIG. 3A depicts a tool embodiment 100 having a logging while drilling tool body 110 in which a transmitter 120 is longitudinally spaced from a linear array 200 of receivers. In the exemplary embodiment depicted, the array 200 includes at least one (and preferably a plurality of longitudinally spaced) acoustic receivers 210 and at least one reference receiver 220 deployed, for example, on the transmitter end of the array 200. Receivers 210 are also referred to herein as regular receivers 210 so as to distinguish them from the reference receivers 220. FIG. 3B depicts a tool embodiment 100' having a logging while drilling tool body 110' in which first and second transmitters 120A and 120B are deployed axially about a linear array 200' of spaced apart receivers 210. In this embodiment, the array 200' includes first and second reference receivers 220, a first of which is deployed, for example, at one axial end of the array 200' and a second of which is deployed, for example, at the other axial end of the array 200'.

In the tool embodiment 200' depicted on FIG. 3B, the first and second transmitters 120A and 120B may advantageously be configured to transmit acoustic energy having different frequencies. For example, the first transmitter 120A may be configured to transmit an acoustic signal having a center frequency in the range from about 12 to about 16 kHz, which may be advantageously utilized to determine a formation compressional wave velocity. The second transmitter 120B may be configured to transmit an acoustic signal having a center frequency in the range from about 4 to about 8 kHz (or less), which may be advantageously utilized to determine a formation shear wave velocity.

Since the tool mode arrivals and drilling noise emanate from different directions (for the upper transmitter), the tool embodiment 200' including first and second reference receivers 220 may advantageously provide for better isolation of these noise signals. Moreover, first and second reference receivers 220 may also provide for better characterization of extensional and flexural wave components of the tool mode since these tool modes travel at different velocities in the tool body 110.

While FIGS. 3A and 3B depict preferred embodiments of the invention in which the reference receiver(s) 220 are deployed in the array 200, 200' of receivers, it will be understood that the invention is not limited in this regard. The reference receiver(s) may be deployed substantially anywhere on the external surface of the tool body 110. For example, as depicted on FIG. 6, a reference receiver may be externally deployed diametrically opposed from the array 200.

Figure 4A:
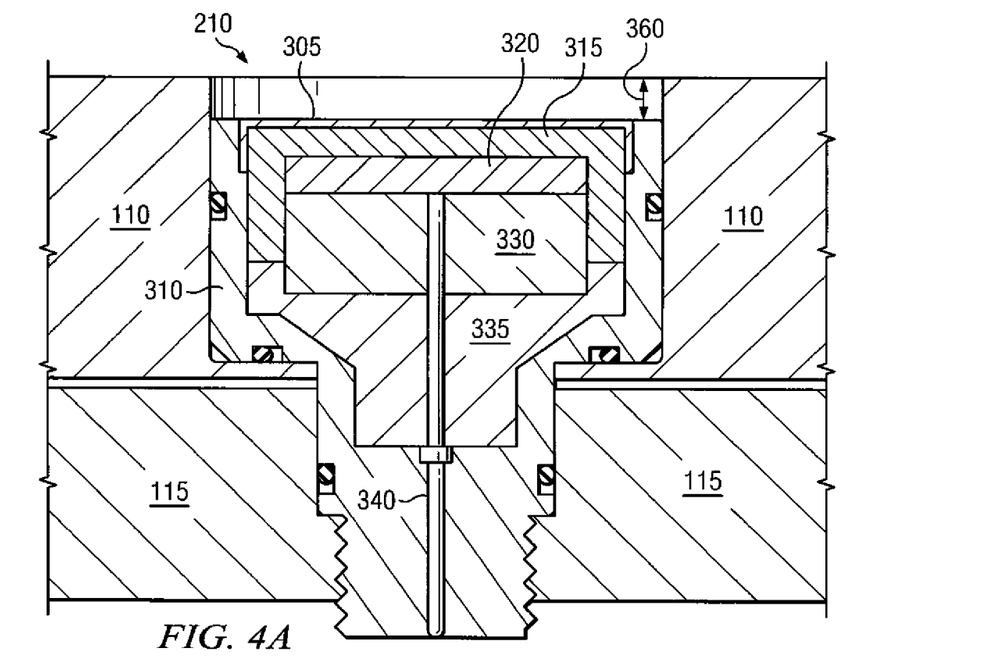
FIG. 4A depicts an exemplary regular receiver used in the tool embodiments depicted on FIGS. 3A and 3B.
Figure 4B:
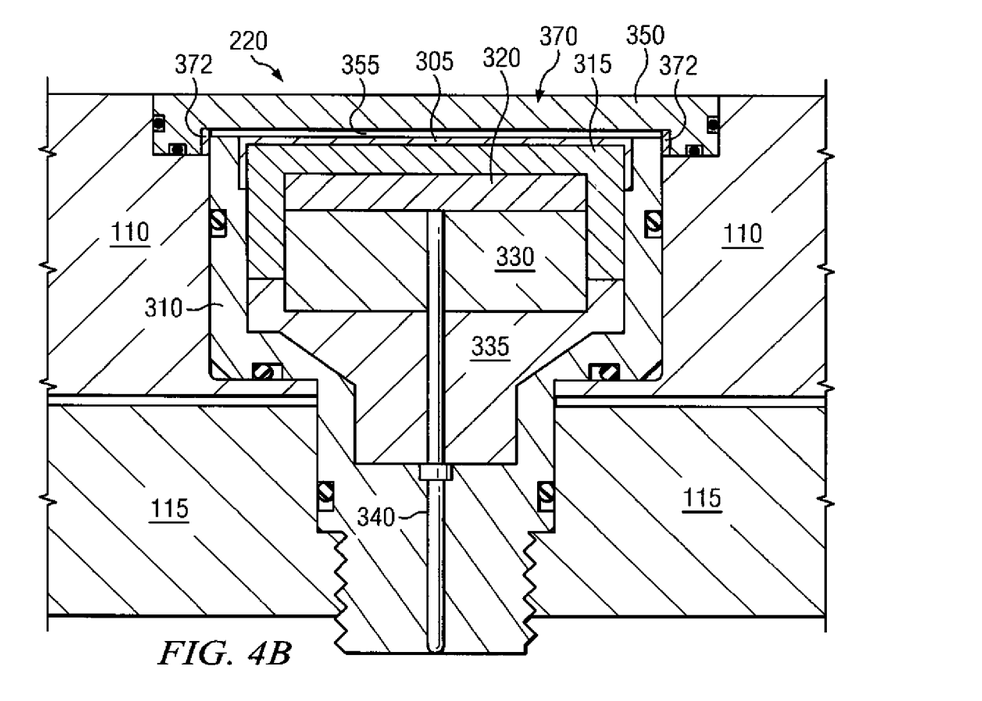
FIG. 4B depicts an exemplary reference receiver used in the tool embodiments depicted on FIGS. 3A and 3B.

Turning now to FIGS. 4A and 4B, exemplary regular receiver 210 (FIG. 4A) and reference receiver 220 (FIG. 4B) embodiments are depicted in more detail. It will be understood that the invention is not limited to any particular regular or reference receiver configuration. The embodiments depicted on FIGS. 4A and 4B are purely exemplary as they pertain to the detailed structure of the receivers 210 and 220. However, FIGS. 4A and 4B do depict a preferred configuration in the sense that the reference receiver 220 is substantially identical to at least one of the regular receivers 210, with the primary exception being that it includes an acoustic isolation structure 370 deployed over the face thereof.

In the exemplary embodiment depicted on FIG. 4A, regular receivers 210 include a multi-layered device having a piezoelectric transducer element 320 interposed between a backing layer 330 and at least one impedance matching layer 315. Such multi-layered receivers are conventional in the prior art. The multi-layered structure may be deployed, for example, in a centralizer 335 so as to center the transducer element 320 in a sensor housing 310. An electrical connector 340 provides for electrical communication between transducer element 320 and a controller (not shown). The exemplary receiver embodiment 210 depicted further includes a protection layer 305 (e.g., a thin layer of titanium metal) deployed over an outer surface of the impedance matching layer 315. The protection layer is intended to provide physical protection for the receiver, for example, from cuttings in the drilling fluid and impacts with the borehole wall.

The piezoelectric transducer 320 may include substantially any piezo-ceramic or piezo-composite material suitable for use in downhole operations. Exemplary piezo-composite transducer elements are disclosed, for example, in commonly assigned U.S. Pat. No. 7,036,363 to Yogeswaren. Backing layer 330 may be fabricated from a highly attenuating material, for example, including a composite mixture of an elastomeric material (rubber) and tungsten powder. One advantageous backing layer is disclosed in commonly assigned U.S. Pat. No. 6,995,500 to Yogeswaren. Matching layer 315 may be fabricated, for example, from an epoxy resin material and is intended to provide acoustic impedance matching between the transducer 320 and drilling fluid in the borehole annulus. Suitable impedance matching layers are disclosed, for example, in commonly assigned U.S. Pat. No. 7,075,215 to Yogeswaren. The invention is not limited in any of these regards.

Sensor housing 310 may be configured for sealable and threadable engagement with the tool body 110. In the exemplary embodiment depicted, sensor housing 310 is threadably engaged with an electronic chassis 115 that is deployed substantially co-axially in an outer housing 110. The invention is of course not limited to such a construction. Those of ordinary skill in the art will appreciate that acoustic sensors are preferably recessed 360 in the tool body 110 so as to minimize direct impacts with the borehole wall.

With further reference now to FIG. 4B, reference receiver 220 is similar (and preferably substantially identical) to regular receiver 210. By substantially identical, it is meant that the reference receiver 220 includes a housing 310 having the same size, shape, and material of construction as that of the regular receivers 210. Reference receiver 220 further includes a multi-layer structure 315, 320, and 330 having the same size, shape, and materials of construction as that of receiver 210. In the exemplary embodiment depicted, reference receiver 220 differs from regular receivers 210 primarily in that it further includes an acoustic isolation structure 370 that is intended to acoustically isolate the receiver 220 from the borehole. In the exemplary embodiment depicted on FIG. 4B, structure 370 includes a high-impedance isolation plate 350 on the front face of the reference receiver 220 and a low-impedance gap 355 behind the plate 350.

The isolator plate 350 is typically fabricated from a metallic material (e.g., steel or tungsten) and is preferably fabricated from a highly stiff, high acoustic impedance material such as tungsten. While the invention is not limited in this regard, the exemplary embodiment depicted on FIG. 4A includes an isolator plate 350 that is flush with an outer surface of the tool body 110. The combined thickness of the plate 350 and gap 355 is approximately equal to the recess depth 360 of the regular receiver 210 (e.g., in the range from about 0.1 to about 0.5 inches). The gap 355 preferably has very low acoustic impedance. In one exemplary embodiment the gap 355 may be air filled or even evacuated. Alternatively, the gap 355 may be liquid filled or filled with foam or an oil-foam mixture so as to provide a pressure balance suitable for use in certain downhole drilling operations. The combination of the high acoustic impedance isolator plate 350 and the low acoustic impedance gap 355 is intended to reflect acoustic energy (particularly low frequency acoustic energy) back into the borehole and thereby substantially isolate the transducer element 320 from external acoustic energy. In the exemplary embodiment depicted, the isolation structure 370 further includes an attenuating ring 372 (e.g., an elastomeric ring) deployed between plate 350 and housing 310.

It will be understood that the reference receiver 220 is intended to be acoustically isolated from the borehole and therefore from the formation signal and the external drilling noise in the borehole annulus and formation as described above with respect to FIG. 1. In preferred embodiments of the invention, the reference receiver(s) 220 are substantially identically configured to the regular receivers 210 and are deployed in the array 200, 200' with the regular receivers 210. In such preferred embodiments, the reference receiver(s) 220 tend to have substantially the same sensitivity as do the regular receivers 210 to the tool mode signal and the internal drilling noise. As a result, the tool mode signals and drilling noise signals may be readily removed (or separated) from the formation signals using straightforward signal processing steps, e.g., including waveform subtraction, signal delay, and gain attenuation. Those of ordinary skill in the art will appreciate that signal delay processing and gain attenuation processing take into account the distinct axial positions of each of the receivers in the array and therefore the distinct distances to the transmitter of each of these receivers. It will be understood that a transmitted signal arrives at the first receiver in an array (i.e., the receiver closest to the transmitter) earlier than it arrives at the last receiver. This delay may be accounted for by using conventional signal delay processing. It will also be understood that the amplitude of the received signal tends to be greater at the first receiver than at the last (due to signal attenuation). This attenuation may be accounted for by using conventional gain attenuation processing.

Figure 5:
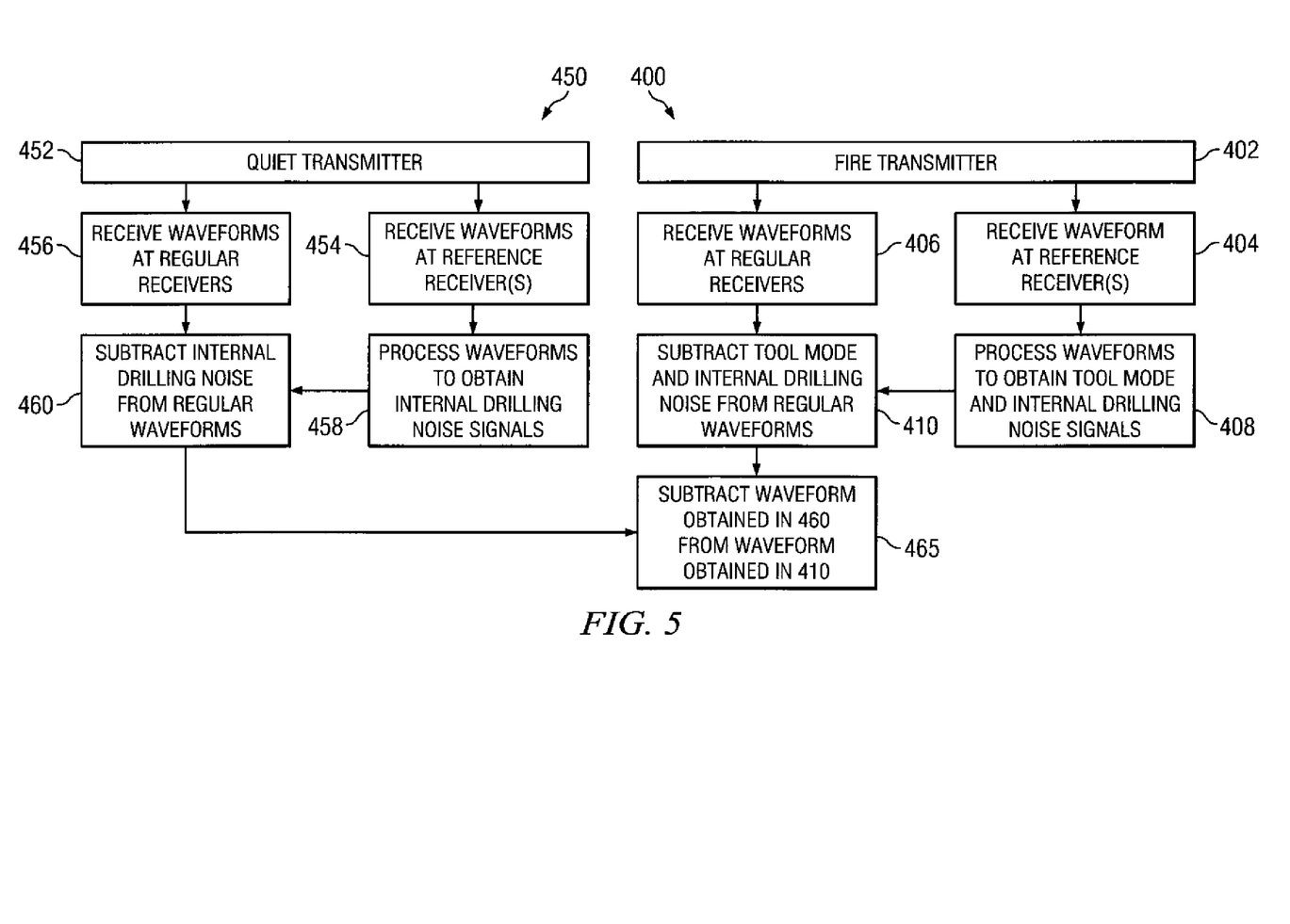
FIG. 5 depicts one exemplary method embodiment in accordance with the present invention for substantially removing tool mode signals and drilling noise from a received waveform.

FIG. 5 depicts one exemplary processing scheme by which tool mode signals and drilling noise may be significantly reduced (or even eliminated) from the waveforms received at the regular receivers 210. Acoustic signals are received at each of the regular receivers 210 and reference receiver(s) 220 in a transmitter firing mode 400 and in a quiet mode 450 (no transmitter firing). In the firing mode, the transmitter is fired at 402 such that each of the regular receivers 210 typically receives formation signals, tool mode signals, and internal and external drilling noise (as described above with respect to FIG. 1). The reference receiver(s) 220 typically receive only tool mode signals and internal drilling noise. The waveform received by the reference receiver(s) is essentially void of formation signals and external drilling noise due to the isolation provided by the isolator plate 350 and gap 355. In quiet mode (no transmitter firing) the transmitter remains idle at 452 such that each of the regular receivers 210 typically receives only internal and external drilling noise signals. Due to the absence of transmitter firing there is no formation signal and tool mode signal. The reference receiver(s) 220 typically receive only internal drilling noise in quiet mode.

With continued reference to FIG. 5, waveforms may be received in firing mode 400 at the reference receiver(s) at 404 and the regular receivers at 406. In the exemplary embodiment depicted, the waveform received at 404 may be processed at 408, for example, using the above described signal delay and gain attenuation techniques, to obtain tool mode signals and internal drilling noise signals at each of the regular receivers. These tool mode signals and internal drilling noise signals (at each of the receivers) may then be subtracted at 410 from the waveforms received at 406 to obtain waveforms including only external signals, e.g., the formation signal and the external drilling noise.

Waveforms may also be received in quiet mode 450 at the reference receiver(s) at 454 and the regular receivers at 456. In the exemplary embodiment depicted, the waveform received at 454 may be processed at 458, for example, using the above described signal delay and gain attenuation techniques, to obtain internal drilling noise signals at each of the regular receivers. These internal drilling noise signals (at each of the receivers) may then be subtracted at 460 from the waveforms received at 456 to obtain waveforms including only external drilling noise signals. The waveforms obtained at 460 (including external drilling noise) may then be subtracted at 465 from the waveforms obtained at 410 (including the formation signal and external drilling noise) to obtain corrected waveforms including essentially only the formation signals.

It will be appreciated by those of ordinary skill in the art that the received waveforms may be processed so as to isolate other acoustic signals. For example, the tool mode signals and drilling noise signals may also be isolated thereby enabling tool mode propagation and drilling noise propagation and dynamics to be evaluated. As described above with respect to FIG. 5, the internal drilling noise is isolated in the waveform received in quiet mode at 454. The external drilling noise may be obtained (as described above) at 460 by subtracting the waveforms obtained at 458 from those received at 456. The total drilling noise signal (internal plus external noise) is isolated in the waveforms received in quiet mode at 456. The tool mode signal may be isolated by subtracting the waveform obtained at the reference receiver in quiet mode at 454 from the waveform received at the reference receiver during firing mode at 404.

It will further be appreciated that drilling noise signals may be removed from the received acoustic waveforms without the use of the above described reference receiver(s). For example, the waveforms received at the regular receivers in quiet mode may be subtracted from the waveforms received in firing mode to obtain waveforms including only formation and tool mode signals.

Tool mode and formation signals may also be isolated by making acoustic measurements when in a "pump-off" mode, for example, when a length of drill pipe is being added to the drill string. In this pump-off mode there is essentially no drilling noise. The acoustic waveforms received by the regular receivers typically include formation and tool mode signals while the waveforms received by the reference receiver(s) include only tool mode signals. The formation signals may be isolated by subtracting the reference waveform(s) from the regular waveforms.

Figure 6:
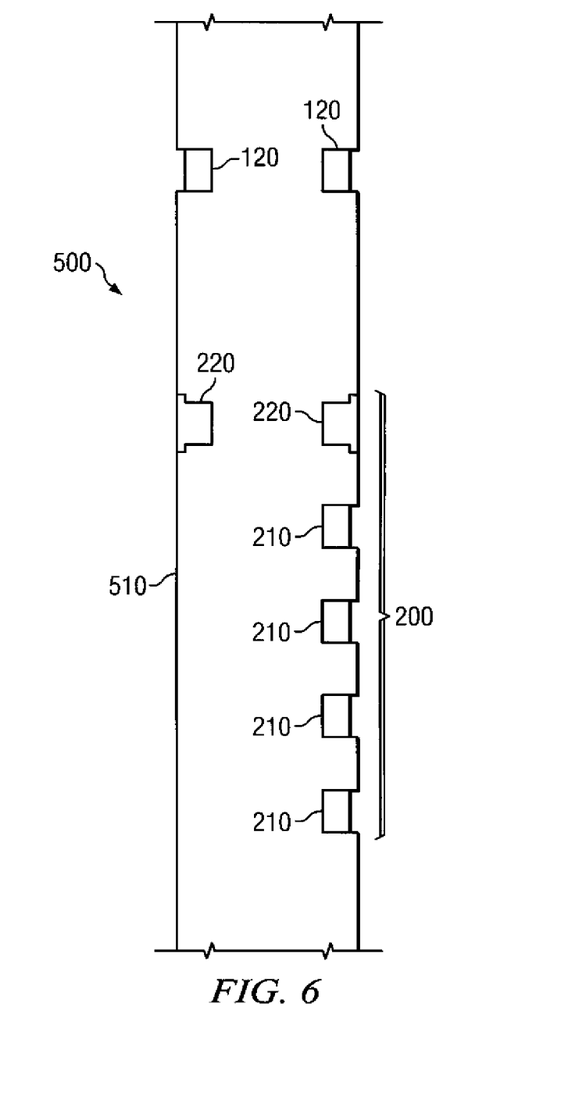
FIG. 6 depicts another alternative embodiment of an acoustic logging tool in accordance with the present invention.

It will be appreciated that the invention is not limited to embodiments in which the regular receivers and/or reference receivers are all circumferentially aligned with one another. Nor is the invention limited to tool embodiments including any particular number of reference receivers. Substantially any suitable number of reference receivers may be deployed at substantially any external location on the tool body 110. FIG. 6 depicts an alternative tool embodiment 500 configured for dipole acoustic logging. Embodiment 500 includes first and second circumferentially opposed transmitters 120 and first and second circumferentially opposed reference receivers 220 deployed on the tool body 510. Those of skill in the art will readily appreciate that the measurement tools in accordance with the present invention may also be configured for quadrupole acoustic logging. The invention is expressly not limited in these regards.

Although not shown on FIGS. 3A, 3B, and 6 it will be appreciated that downhole tools in accordance with this invention typically include an electronic controller. Such a controller typically includes conventional electrical drive voltage electronics (e.g., a high voltage power supply) for applying waveforms to the transmitters 120. The controller typically also includes receiving electronics, such as a variable gain amplifier for amplifying the relatively weak return signal (as compared to the transmitted signal). The receiving electronics may also include various filters (e.g., pass band filters), rectifiers, multiplexers, and other circuit components for processing the return signal.

A suitable controller typically further includes a digital programmable processor such as a microprocessor or a microcontroller and processor-readable or computer-readable programming code embodying logic, including instructions for controlling the function of the tool. Substantially any suitable digital processor (or processors) may be utilized, for example, including an ADSP-2191M microprocessor, available from Analog Devices, Inc. The controller may be disposed, for example, to execute the methods described above with respect to FIG. 5.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect borehole azimuth and inclination as well as the tool face of the receivers. The controller may also optionally communicate with other instruments in the drill string, such as telemetry systems that communicate with the surface. The controller may further optionally include volatile or non-volatile memory or a data storage device. The artisan of ordinary skill will readily recognize that the controller may be disposed elsewhere in the drill string (e.g., in another LWD tool or sub).

Although the present invention and its advantages have been described in detail, it should be understood that various changes, substitutions and alternations can be made herein without departing from the spirit and scope of the invention as defined by the appended claims.

We claim:

1. A downhole acoustic measurement tool, comprising:
a downhole tool body;
at least one acoustic transmitter deployed on the tool body, the transmitter configured to transmit an acoustic wave into a subterranean borehole;
at least one regular acoustic receiver deployed on an external surface of the tool body, the regular receiver being longitudinally spaced from the transmitter and configured to receive a transmitted acoustic waveform; and
at least one reference acoustic receiver deployed on the external surface of the tool body, the reference receiver including an acoustic isolation structure deployed on a radially outward facing surface of the receiver such that the reference receiver is acoustically isolated from the borehole.

2. The downhole tool of claim 1, wherein the regular receiver and the reference receiver comprise a linear array of acoustic receivers.

3. The downhole tool of claim 2, wherein the linear array of receivers comprises a plurality of longitudinally spaced apart regular receivers.

4. The downhole tool of claim 3, wherein the reference receiver is deployed on an axial end of the linear array of receivers closest to the transmitter.

5. The downhole tool of claim 3, wherein the linear array of receivers comprises first and second reference receivers, the first and second reference receivers being deployed on corresponding first and second axial ends of the linear array of receivers.

6. The downhole tool of claim 5 further comprising first and second transmitters, the linear array of receivers being deployed axially between the first and second transmitters.

7. The downhole tool of claim 1 further comprising a controller, the controller configured to: (i) cause the transmitter to transmit an acoustic waveform, (ii) cause the regular receiver and the reference receiver to receive corresponding acoustic waveforms, and (iii) subtract the waveform received by the reference receiver from the waveform received by the regular receiver.

8. The downhole tool of claim 7, wherein the controller is further configured to (iv) cause the regular receiver and the reference receiver to receive corresponding acoustic waveforms in a quiet tool mode between transmitter firings.

9. The downhole tool of claim 1, wherein the acoustic isolation structure comprises a high acoustic impedance isolator plate deployed on a radially outward facing surface of the reference receiver and a low acoustic impedance gap interposed between the isolation plate and an acoustic transducer.

10. The downhole tool of claim 9, wherein the isolator plate comprises tungsten and the gap is evacuated, air filled, liquid filled, foam filled, or filled with a foam oil mixture.

11. The downhole tool of claim 9, wherein the isolator plate is flush with an outer surface of the tool body and comprises a tungsten plate having a thickness in a range from about 0.1 to about 0.5 inches.

12. A downhole acoustic measurement tool, comprising:
a downhole tool body;
at least one acoustic transmitter deployed on the tool body, the transmitter configured to transmit an acoustic wave into a subterranean borehole;
a linear array of acoustic receivers deployed on an external surface of the tool body, the array of receivers being longitudinally spaced from the transmitter and including a plurality of longitudinally spaced apart regular receivers and at least one reference receiver, the reference receiver being configured such that it is acoustically isolated from the borehole;
at least one of the regular receivers and the reference receiver comprising a multi-layer structure deployed in a receiver housing, the multi-layer structure including an acoustic transducer interposed between an impedance matching layer and an attenuating backing layer; and
wherein (i) the regular receiver housing and the reference receiver housing are the same size and shape and are fabricated from the same material and (ii) the regular receiver multi-layer structure and the reference receiver multi-layer structure are the same size and shape and are fabricated from the same materials.

13. The downhole tool of claim 12, wherein the reference receiver further comprises:
an isolation structure including a high acoustic impedance isolator plate deployed on a radially outward facing surface of the reference receiver; and
a low acoustic impedance gap interposed between the isolator plate and the acoustic transducer.

14. The downhole tool of claim 13, wherein:
the regular receivers and the reference receiver are each recessed into the tool body; and
the isolator plate is deployed in said reference receiver recess such that it is flush with an outer surface of the tool body.

15. The downhole tool of claim 12, further comprising first and second transmitters, the linear array of receivers being deployed axially between the first and second transmitters; and
wherein the array of receivers comprises first and second reference receivers, the first and second reference receivers being deployed on corresponding first and second axial ends of the array of receivers.

16. The downhole tool of claim 12 further comprising a controller, the controller configured to: (i) cause the transmitter to transmit an acoustic waveform, (ii) cause each of the regular receivers and the reference receiver to receive corresponding acoustic waveforms, and (iii) subtract the waveform received by the reference receiver from a corresponding waveform received by at least one of the regular receivers.

17. The downhole tool of claim 16, wherein the controller is further configured to (iv) cause the regular receivers and the reference receiver to receive corresponding acoustic waveforms in a quiet tool mode between transmitter firings.

* * * * *